United States Patent
Damick et al.

(10) Patent No.: US 10,673,985 B2
(45) Date of Patent: *Jun. 2, 2020

(54) ROUTER-HOST LOGGING

(71) Applicant: Oath Inc., Dulles, VA (US)

(72) Inventors: Jeffrey Joseph Damick, South Riding, VA (US); Sean Cunningham, Washington, DC (US)

(73) Assignee: Oath Inc., Dulles, VA (US)

( * ) Notice: Subject to any disclaimer, the term of this patent is extended or adjusted under 35 U.S.C. 154(b) by 344 days.

This patent is subject to a terminal disclaimer.

(21) Appl. No.: 15/237,273

(22) Filed: Aug. 15, 2016

(65) Prior Publication Data

US 2017/0041432 A1 Feb. 9, 2017

Related U.S. Application Data

(63) Continuation of application No. 11/395,540, filed on Apr. 3, 2006, now Pat. No. 9,438,683.
(Continued)

(51) Int. Cl.
*H04L 29/08* (2006.01)
*G06F 21/57* (2013.01)
(Continued)

(52) U.S. Cl.
CPC .......... *H04L 67/327* (2013.01); *G06F 21/577* (2013.01); *H04L 63/0876* (2013.01);
(Continued)

(58) Field of Classification Search
CPC . H04L 67/327; H04L 63/0876; H04L 63/102; H04L 63/107; G06F 21/577
(Continued)

(56) References Cited

U.S. PATENT DOCUMENTS 5,696,898 A 12/1997 Baker et al.
5,889,958 A 3/1999 Willens
(Continued)

OTHER PUBLICATIONS

Entrust, "Understanding Digital Certificates and Wireless Transport Layer Security (WTLS)", Jan. 2001, <http://www.entrust.net/ssl-resources/pdf/understanding_wtls.pdf>.

*Primary Examiner* — Meng Vang
(74) *Attorney, Agent, or Firm* — Bookoff McAndrews, PLLC

(57) ABSTRACT

According to a general aspect, a method includes receiving, at a network interface device at a user location, a request from a first machine located at the user location, the request including a first-machine identifier and a request to access through the network interface device a first location on a network. The method also includes logging, at the network interface device, the request from the first machine into a first-machine log for requests from the first machine, the logging into the first-machine log being based on the first-machine identifier. The method also includes receiving at the network interface device a request from a second machine located at the user location, the request from the second machine including a second-machine identifier and a request to access through the network interface device a second location on the network, and the network interface device, the first machine, and the second machine being located at a user location. The method further includes logging, at the network interface device, the request from the second machine into a second-machine log for all requests from the second machine, the logging into the second-machine log being based on the second-machine identifier.

19 Claims, 11 Drawing Sheets

Related U.S. Application Data

(60) Provisional application No. 60/758,986, filed on Jan. 17, 2006, provisional application No. 60/686,420, filed on Jun. 2, 2005, provisional application No. 60/667,664, filed on Apr. 4, 2005.

(51) Int. Cl.
  *H04L 29/06* (2006.01)
  *H04W 12/08* (2009.01)
  *H04W 24/10* (2009.01)
  *H04W 48/08* (2009.01)

(52) U.S. Cl.
  CPC ......... *H04L 63/102* (2013.01); *H04L 63/107* (2013.01); *H04L 67/18* (2013.01); *H04L 67/22* (2013.01); *H04L 67/28* (2013.01); *H04L 67/2819* (2013.01); *H04W 12/08* (2013.01); *H04W 24/10* (2013.01); *H04W 48/08* (2013.01); *H04L 63/0263* (2013.01); *H04L 63/0807* (2013.01)

(58) Field of Classification Search
  USPC ........................................................ 709/226
  See application file for complete search history.

(56) References Cited

U.S. PATENT DOCUMENTS

| | | |
|---|---|---|
| 5,987,606 A | 11/1999 | Cirasole et al. |
| 5,991,810 A | 11/1999 | Shapiro et al. |
| 6,122,740 A | 9/2000 | Anderson |
| 6,339,423 B1* | 1/2002 | Sampson ............... G06Q 30/02 705/26.35 |
| 6,377,993 B1 | 4/2002 | Brandt |
| 6,381,632 B1 | 4/2002 | Lowell |
| 6,792,474 B1 | 9/2004 | Hopprich |
| 6,795,888 B1 | 9/2004 | Apacible et al. |
| 6,826,692 B1 | 11/2004 | White |
| 6,862,277 B2* | 3/2005 | Pan ..................... H04L 65/1069 370/352 |
| 7,080,051 B1 | 7/2006 | Crawford |
| 7,194,536 B2 | 3/2007 | Fellenstein et al. |
| 7,246,156 B2* | 7/2007 | Ginter .................... G06Q 30/06 705/26.1 |
| 7,373,502 B2 | 5/2008 | McGrew |
| 7,792,127 B2 | 9/2010 | Kimura |
| 2001/0056550 A1 | 12/2001 | Lee |
| 2002/0023160 A1 | 2/2002 | Garrett |
| 2002/0133412 A1* | 9/2002 | Oliver ................ G05B 19/0425 709/219 |
| 2002/0138762 A1 | 9/2002 | Horne |
| 2003/0051161 A1 | 3/2003 | Smith et al. |
| 2003/0055809 A1* | 3/2003 | Bhat ................. G06F 17/30368 |
| 2003/0110262 A1* | 6/2003 | Hasan ................. H04L 41/0213 709/226 |
| 2003/0163692 A1 | 8/2003 | Kleinsteiber |
| 2003/0163731 A1 | 8/2003 | Wigley et al. |
| 2003/0200455 A1 | 10/2003 | Wu |
| 2003/0217292 A1 | 11/2003 | Steiger et al. |
| 2003/0233447 A1 | 12/2003 | Fellenstein et al. |
| 2004/0103021 A1 | 5/2004 | Scarfe et al. |
| 2004/0167958 A1 | 8/2004 | Stewart |
| 2004/0268119 A1 | 12/2004 | Smetters |
| 2005/0033656 A1* | 2/2005 | Wang ................ H04L 29/12783 709/225 |
| 2005/0101296 A1 | 5/2005 | Ito et al. |
| 2005/0114653 A1* | 5/2005 | Sudia .................. H04L 63/0823 713/158 |
| 2005/0138170 A1* | 6/2005 | Cherkasova ............ G06F 21/55 709/217 |
| 2005/0177640 A1 | 8/2005 | Rubenstein |
| 2005/0198319 A1 | 9/2005 | Chan et al. |
| 2006/0041655 A1* | 2/2006 | Holloway ................. G06F 1/18 709/223 |
| 2006/0064469 A1 | 3/2006 | Balasubrahmaniyan et al. |
| 2006/0089987 A1* | 4/2006 | Igarashi ............... H04L 12/2809 709/230 |
| 2006/0126613 A1 | 6/2006 | Zweig |
| 2006/0168264 A1* | 7/2006 | Baba ..................... H04L 41/145 709/225 |
| 2006/0218629 A1 | 9/2006 | Pearson et al. |
| 2007/0192862 A1 | 8/2007 | Vermeulen |
| 2011/0099621 A1 | 4/2011 | Lizarraga |

* cited by examiner

FIG. 6C

ROUTER-HOST LOGGING

CROSS REFERENCE TO RELATED APPLICATIONS

This application is a continuation of and claims the benefit of priority of U.S. patent application Ser. No. 11/395,540, filed Apr. 3, 2006 (now U.S. Pat. No. 9,438,683), which claims priority to U.S. Provisional Application No. 60/758,986, filed Jan. 17, 2006, U.S. Provisional Application No. 60/686,420, filed Jun. 2, 2005, and U.S. Provisional Application No. 60/667,664, filed Apr. 4, 2005. The disclosures of the above-referenced applications are expressly incorporated herein by reference to their entireties.

TECHNICAL FIELD

This disclosure relates, in part, to logging network communications.

BACKGROUND

Users may access content from a network, such as the Internet. In various systems, users make requests for content, using for example a browser. Systems are available to log these user requests, and provide the log to one or more interested parties. In addition to logging the requests from the users, the requests may also be screened to determine if the content that is requested is suitable for the user. If the content is deemed not to be suitable for the user, then the content may be blocked.

SUMMARY

According to a general aspect, a method includes receiving, at a network interface device at a user location, a request from a first machine located at the user location, the request including a first-machine identifier and a request to access through the network interface device a first location on a network. The method also includes logging, at the network interface device, the request from the first machine into a first-machine log for requests from the first machine, the logging into the first-machine log being based on the first-machine identifier. The method also includes receiving at the network interface device a request from a second machine located at the user location, the request from the second machine including a second-machine identifier and a request to access through the network interface device a second location on the network, and the network interface device, the first machine, and the second machine being located at a user location. The method further includes logging, at the network interface device, the request from the second machine into a second-machine log for all requests from the second machine, the logging into the second machine log being based on the second-machine identifier.

According to another general aspect, a method includes establishing a connection between a network interface device and a first network service provider having network access control rules. The method further includes receiving, at the network interface device, a request from a machine to access a second network service provider through the network interface device, the second network service provider being different from the first network service provider. The method further includes providing, by the network interface device, access between the machine and the second network service provider through the network interface device. The method further includes accessing, by the network interface device, a network access control rule from the first network service provider that governs service provided to the machine from any network service provider. The method also includes applying, by the network interface device, the network access control rule to the machine while the machine is connected with the second network service provider, to limit the service provided to the machine from the second network service provider.

According to another general aspect, a method includes receiving, at a network interface device at a user location, a request from a first machine located at the user location, the request including a first-machine identifier and a request to access through the network interface device a first location on a network. The method also includes accessing a first-machine network access rule. The method also includes determining, based on the accessed first-machine network access rule, whether to grant the first machine access to the first location on the network. The method further includes receiving at the network interface device a request from a second machine located at the user location, the request from the second machine including a second-machine identifier and a request to access through the network interface device a second location on the network, and the network interface device, the first machine, and the second machine being located at a user location. The method also includes accessing a second-machine network access rule. The method further includes determining, based on the accessed second-machine network access rule, whether to grant the second machine access to the second location on the network.

Implementations of the above general aspects may include one or more of a variety of features, such as those described elsewhere in this disclosure. Further, the claims that are listed at the end of this disclosure are to be considered as part of the specification for all purposes. Accordingly, the content of the claims is included in the specification for all purposes.

The various aspects, implementations, and features may be implemented in a variety of manners, even if only described herein in, for example, a single manner. The various aspects, implementations, and features may be implemented using, for example, one or more of: a method; an apparatus; an apparatus for performing a method; a program or other set of instructions for performing one or more aspects, implementations, or features; an apparatus that includes a program or other set of instructions; a computer readable medium; or a propagated signal. The computer readable medium or propagated signal may include; for example, instructions, software, and other data. The various aspects, implementations; and features may also include additional components, such as, for example, a computer, a router, a server, or a peripheral device.

The details of one or more implementations are set forth in the accompanying drawings and the description below. Other features will be apparent from the description and drawings, and from the claims.

DESCRIPTION OF DRAWINGS

FIG. 6C illustrates an exemplary log report of access requests.

DETAILED DESCRIPTION

In one implementation, a system includes multiple computers in a home that are connected to a router that is also in the home. The computers access the Internet through the router, and the router keeps a log of Internet activity for each of the computers. The router uploads the log on a regular basis to a host computer on the Internet, and the host computer makes the logs available to an authorized viewer in one or more of a variety of useful formats that are configurable by the authorized viewer. The router also controls access to the Internet for each of the computers by applying access rules to determine whether to grant or to deny access to any particular Internet site that is requested at one of the computers. The access rules may be varied based on the computer or the user that is using the computer.

Figure 1:
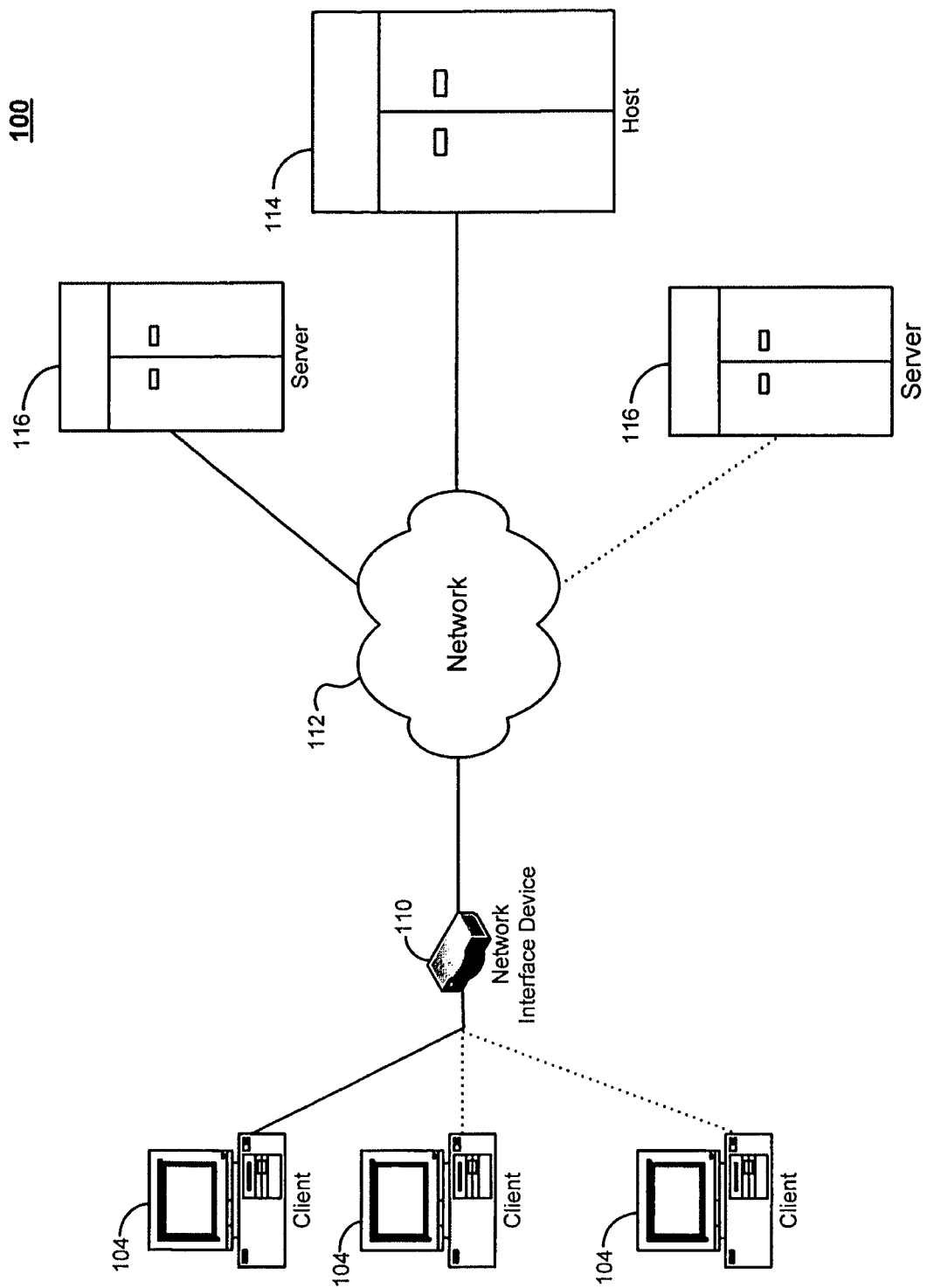
FIG. 1 illustrates an exemplary system configured to provide network access control and logging.

Referring to FIG. 1, system 100 is shown to be configured to provide network communication. System 100 includes several clients 104 coupled to a network interface device 110 that is coupled to a network 112. The network 112 also is coupled to a host 114 and servers 116. The host 114 may be configured to provide network access rules and the servers 116 may be configured to provide content for a user of client 104. The dashed lines in FIG. 1 indicate optional connections.

A client 104 may include devices with which the user interacts in order to send a request to access a network location. For example, a client 104 may be a personal computer, laptop, cell phone, or personal data assistant. A client 104 also, or alternatively, may include an application, a piece of software, or a set of instructions, with which the user interacts in order to send a request to access a network location. Multiple clients 104 may all be co-located in one building, home, or other user location.

A client 104 may be configured to communicate with the network interface device 110 through various methods, such as wireless networking or Ethernet cable. The network interface device 110 may include, for example, a router, and it may be utilized to link multiple clients 104 to the network 112. The network 112 may include, for example, the Internet, and servers 116, and the host 114 may include devices connected to the Internet.

In one implementation, system 100 is configured to provide Internet access for one or more of the clients 104. The host 114 provides network access rules (or simply access rules) that result in the network interface device 110 granting or denying a request, received through the network 112 from a user of a client 104, to access resources hosted at or available through servers 116. The access rules are stored on the host 114 and may be transferred to the network interface device 110. Access rules on the host 114 may be accessed for all requests. In other implementations, access rules on the host 114 are accessed only for some requests.

Note that the access rules may be static rules that are created once and not changed. Alternatively, the access rules may be rules that are (1) updated regularly, (2) updated automatically using, for example, new votes/ratings that are received from users, and/or (3) updated automatically using, for example, various forms of artificial intelligence.

Figure 2:
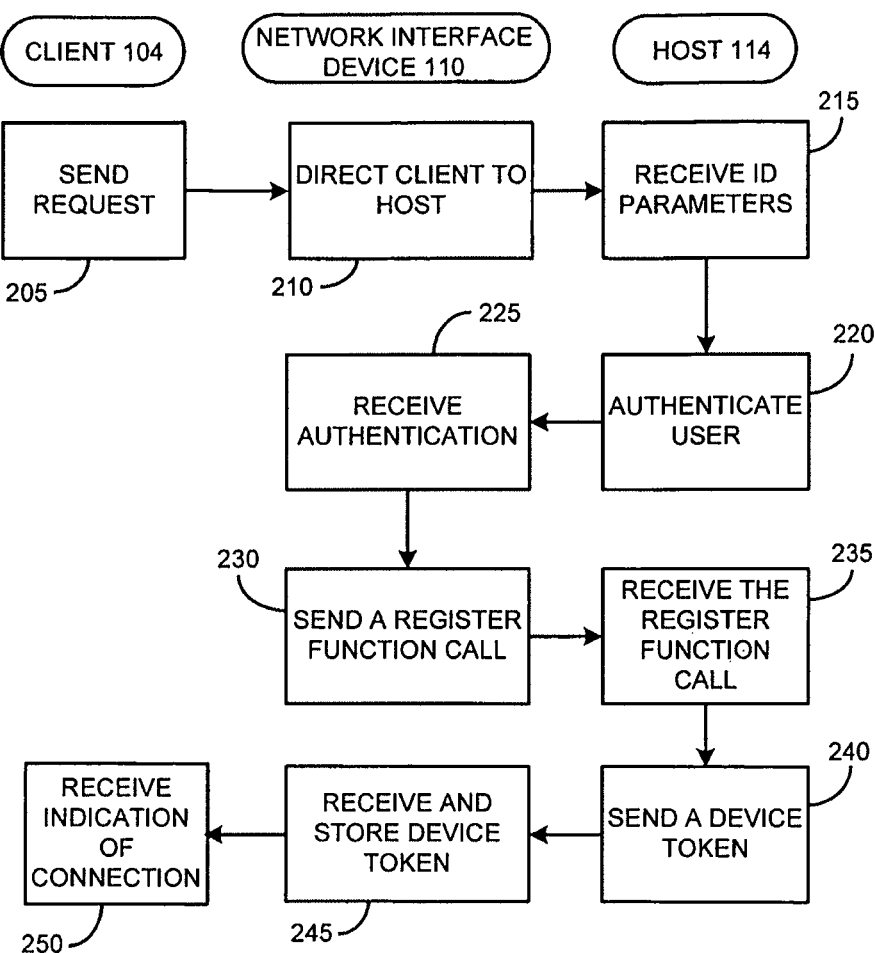
FIG. 2 illustrates an exemplary process for registering a network interface device.

Referring to FIG. 2, a process 200 involves a network interface device establishing an initial connection with a host. Process 200 focuses, in part, on establishing a connection between the network interface device and the host because later figures provide additional detail to illustrate aspects of the network interface device performing a variety of services while in communication with the host.

The process 200 may be used in conjunction with the system 100 of FIG. 1 and, accordingly, the discussion below and FIG. 2 itself describe the process 200 in the context of the system 100. However, other systems may be used.

Moreover, implementations of the process 200 may be performed, for example, only one time at the initial configuration of the network interface device 110 (as indicated in the description below of the process 200), or each time the network interface device 110 is powered on. Implementations of the process 200 may be initiated, for example, by a request for content from the client 104 (as indicated in FIG. 2), or by a self-initiated request for connection or configuration by the network interface device 110. The following therefore describes one exemplary implementation of a process for establishing an initial connection with a host.

Process 200 includes the client 104 sending a request for content to the host 114 through the network interface device 110 (205). The request, also referred to as an initiation request, is intended to establish initial communications between the client 104 and the host 114, and serves as a useful vehicle for prompting the network interface device 110 to establish an initial connection with the host 114 and perform configuration procedures. The initiation request may be sent, for example, automatically when the client 104 is turned on or may be sent as a result of the user manually launching a software program on the client 104. The initiation request contains an identifier of the client 104 such as, for example, a media access control or internet protocol address.

The initiation request is received by the network interface device 110 which then directs the client 104 to the host 114 and sends to the host 114 identification parameters of the network interface device 110 (210). The identification parameters may be, for example, a media access control (i.e., MAC) or IP (Internet Protocol) address. The identification parameters allow the host 114 to identify the network interface device 110 and allow the host 114 to store a profile for the network interface device 110.

The host 114 receives the identification parameters (215) and authenticates the user (220). Authenticating the user (220) may be conducted automatically or it may require user input, such as a password or login number. A notice of authentication, which may optionally include a reservation number, is generated and then sent to the network interface device 110. The reservation number also is associated with the network interface device 110.

Upon receipt of the authentication (225), the network interface device 110 sends a register function call to the host 114 (230). The register function call may include the reservation number as well as a network interface device 110 identification number. The register function call is the mechanism by which the network interface device initially registers with the host 114 so that the host 114 will be configured to receive log reports and access rule requests from the network interface device 110, as described in more detail below. Implementations may wait, as in the process 200, for user authentication to be complete before sending a register function call, for security purposes. However, other implementations, for example, send a register function call without authenticating a user.

In response to receiving the register function call (235), the host 114 generates and sends a device token to the network interface device 110 (240). The device token is generated based on some identifying information for the network interface device 110, such as, for example, the identification parameters earlier received (see 215). By generating the device token based on stored information for the network interface device 110, the host 114 is able to regenerate the device token as explained with respect to FIG. 3 below.

The device token instructs the network interface device 110 to conduct a grant-or-deny procedure for each of the access requests generated by the client 104. The network interface device 110 receives the device token and stores the device token locally on the network interface device 110 (245). Optionally, an indication of connection between the network interface device 110 and the host 114 based on the device token may be sent to the client 104 (250).

Establishing the initial connection of the network interface device 110 may be conducted differently or not at all. For example, the process 200 may be conducted automatically when the network interface device 110 first establishes a connection to the network 112. In another implementation, a user may initiate the process 200 by manually selecting initiation options on the client 104, in which case the selection options are later sent to the host 114 through the network interface device 110.

Various system configuration options may be configured by a user during initiation, such as during the authentication of the user (220), which may be interactive between the user and the host 114. The configuration options may allow the user to limit access through the network interface device 110 to the host 114 or one or more servers 116, which represent locations accessible through the network 112. Such configuration options may apply to all clients 104 connected to the network interface device 110. The configuration options may allow access to be limited based on, for example, network locations, time of day, bandwidth, or content. Upon receiving a request for content from a client 104, the network interface device 110 may access the configuration options on the host 114 and make a decision to grant or deny access to the requested content.

Figure 3:
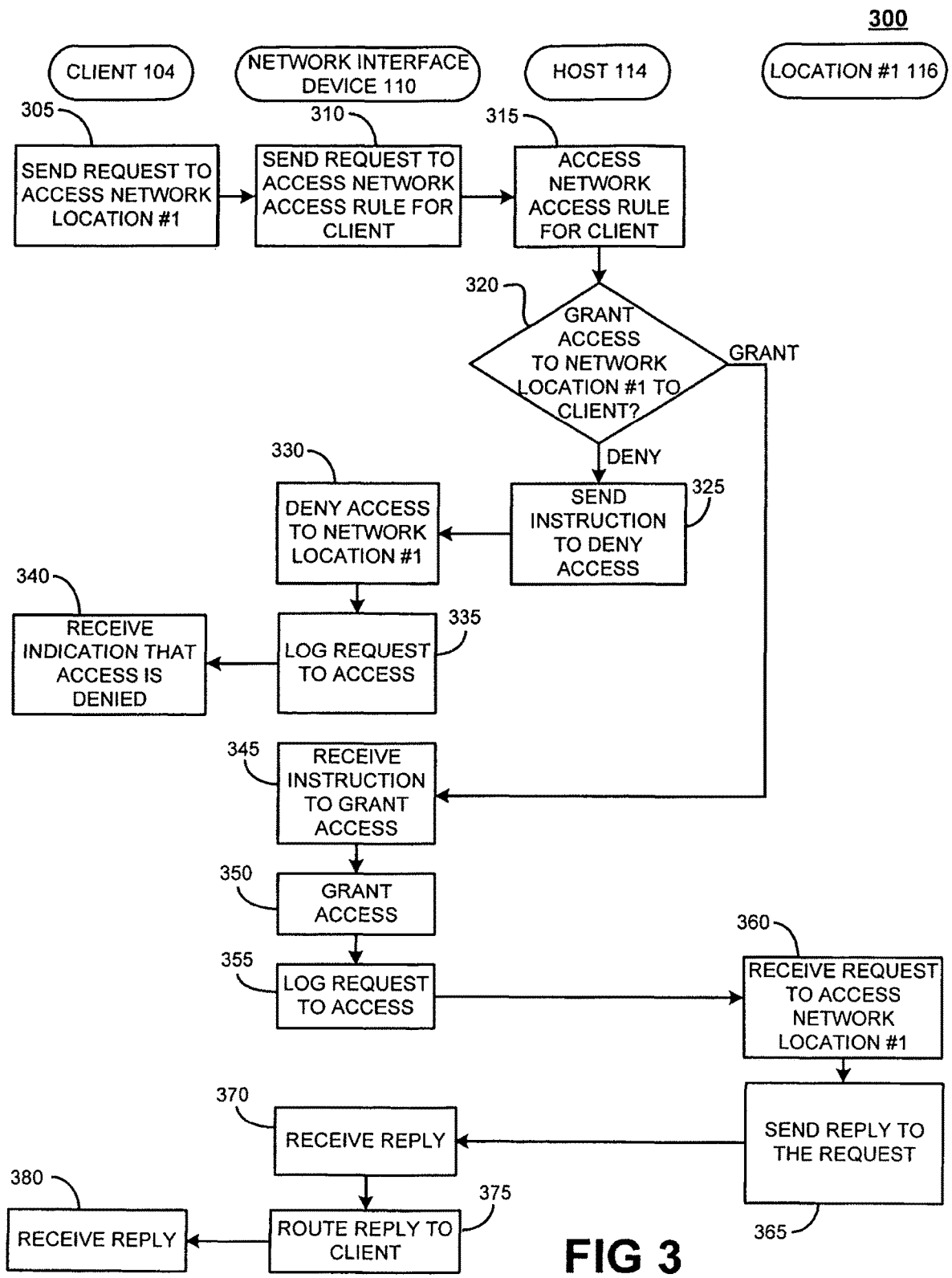
FIG. 3 illustrates an exemplary process for organizing a network interface access request.

Referring to FIG. 3, a process 300 includes a network interface device 110 granting or denying an access request from a client 104. The process 300 may be used in conjunction with the system 100 of FIG. 1, and the discussion below and FIG. 3 itself describe the process 300 in the context of the system 100. However, other systems may be used.

Process 300 includes a client 104 sending a request to access network location #1 (305). The access request is generated when, for example, the user navigates to a website or launches a file sharing program. The access request contains an identifier of the client 104 such as a MAC or IP address. The access request is sent to the network interface device 110 which in turn sends a request to the host 114 to access network access rules for the client 104 (310). The network access rules contain information pertaining to a particular machine (the client 104) and enable a determination of a grant-or-deny decision.

In sending the request to access network access rules, the network interface device 110 includes its device token as well as some additional descriptive information, such as, for example, the identification parameters provided to the host 114 in the process 200. The host 114 receives the request for network access rules, including the device token and the additional descriptive information. The host 114 then verifies the device token by generating the device token again based on the additional descriptive information. In this way, the network interface device 110 must have its device token as well as the particular additional descriptive information in order to be recognized and serviced by the host 114. The verification, by the host 114, of the device token provides a security measure that other implementations need not provide or may provide in a different manner.

The host 114 accesses the access rules pertaining to the client 104 (315). Using the accessed rules, the host 114 determines whether to grant or deny access to network location #1 to the client 104 (320).

If a decision to deny access is determined (320), instructions to deny client 104 access to network location #1 are sent to the network interface device 110 (325). The instructions to deny access are commands that instruct the network interface device 110 not to deliver content at network location #1. The network interface device 110 denies the client 104 access (330) by, for example, canceling the request for access from the client 104, and generates a log of the request from the client 104 to access network location #1 (335). An indication that access to network location #1 has been denied is sent to, and received (340) by, the client 104 (340).

If a decision to grant access is determined (320), instructions to grant access to network location #1 are sent to, and received by (345), the network interface device 110. The instructions to grant access are commands that instruct the network interface device 110 to deliver the content at network location #1. The network interface device 110 grants the client 104 access (350) by, for example, approving the request, and generates a log of the request by the client 104 to access network location #1 (355). The request to access network location #1 is sent to, and received by, network location #1 (360). A reply, to the request to access, which includes content from location #1 116, is generated by network location #1 and is sent to the network interface device 110 (365). The reply from location #1 116 is received by the network interface device 110 (370) and is routed by the network interface device 110 to the client 104 (375). The client 104 receives the reply to the request (380).

The previous description is an example implementation of the grant-or-deny process 300 and other or different operations may be included. For example, logging of the access requests may be performed by the host 114 and determining whether to grant-or-deny access may be performed at the network interface device 110. Multiple clients 104 used by different users may concurrently be involved in separate grant-or-deny processes 300 through the network interface device 110.

Figure 4:
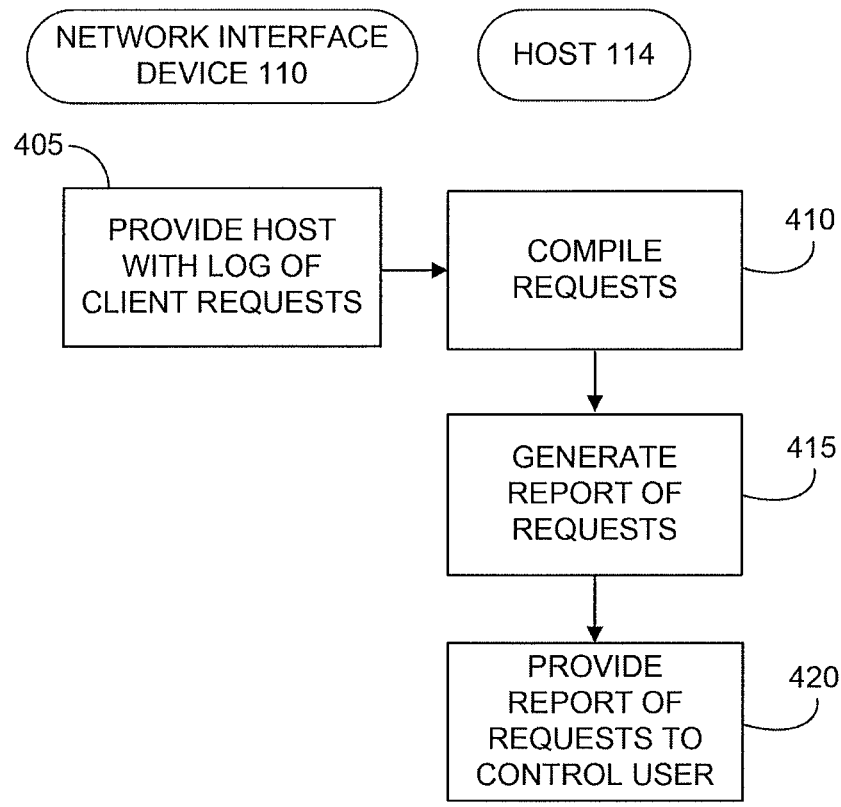
FIG. 4 illustrates an exemplary process for organizing an access request log report.

Referring to FIG. 4, a process 400 may be used for organizing an access request log report. The process 400 may be used in conjunction with the system 100 of FIG. 1 and the discussion below, as well as FIG. 4 itself, describe the process 400 in the context of the system 100. However, other systems may be used. In one implementation, the process 400 is carried out once per week. In other implementations, the process 400 is carried out after every grant-or-deny decision is determined.

In process 400, a network interface device 110 provides a log of requests from the client 104 to the host 114 (405). The log of requests from the client 104 includes data associated with the access requests and the grant-or-deny decision accompanying each access request. The log tracks all requests from the client 104 regardless of which user may have been using the client 104.

The host 114 receives and compiles the log of requests (410). Compiling the requests includes processing to simplify data such as, for example, combining access requests into a group associated with all access requests for a particular network location.

A report of the log of requests is generated by the host 114 (415). The report is provided to a user having the appropriate rights to view the report (420). Such a user is referred to as a control user. The report contains information described in the compiled requests and may be provided in various forms, such as, for example, in a webpage or an email.

Implementations may perform the operation of providing the host 114 with logs of requests (405) multiple times prior to the host 114 generating a report of the log of requests. For example, the network interface device 110 may provide a log of requests for the client 104 to the host 114 (405) after every request for content from the client 104, or every few seconds so as, for example, not to unnecessarily consume bandwidth at critical times. Further, the host 114 may receive the numerous logs, but only generate the log of requests (415) once every twenty-four hours, or whenever specifically requested by an authorized user. Note that the generated report may be provided automatically to an authorized user by, for example, the host 114 sending the report by e-mail automatically every twenty-four hours.

The previous description is an example implementation of organizing an access request log report. Other, or different, operations may be included. For example, the compiling of requests (410) for the client 104 and the generation of a report of the log of requests (415) maybe conducted at the network interface device 110 instead of the host 114.

Figure 5A:
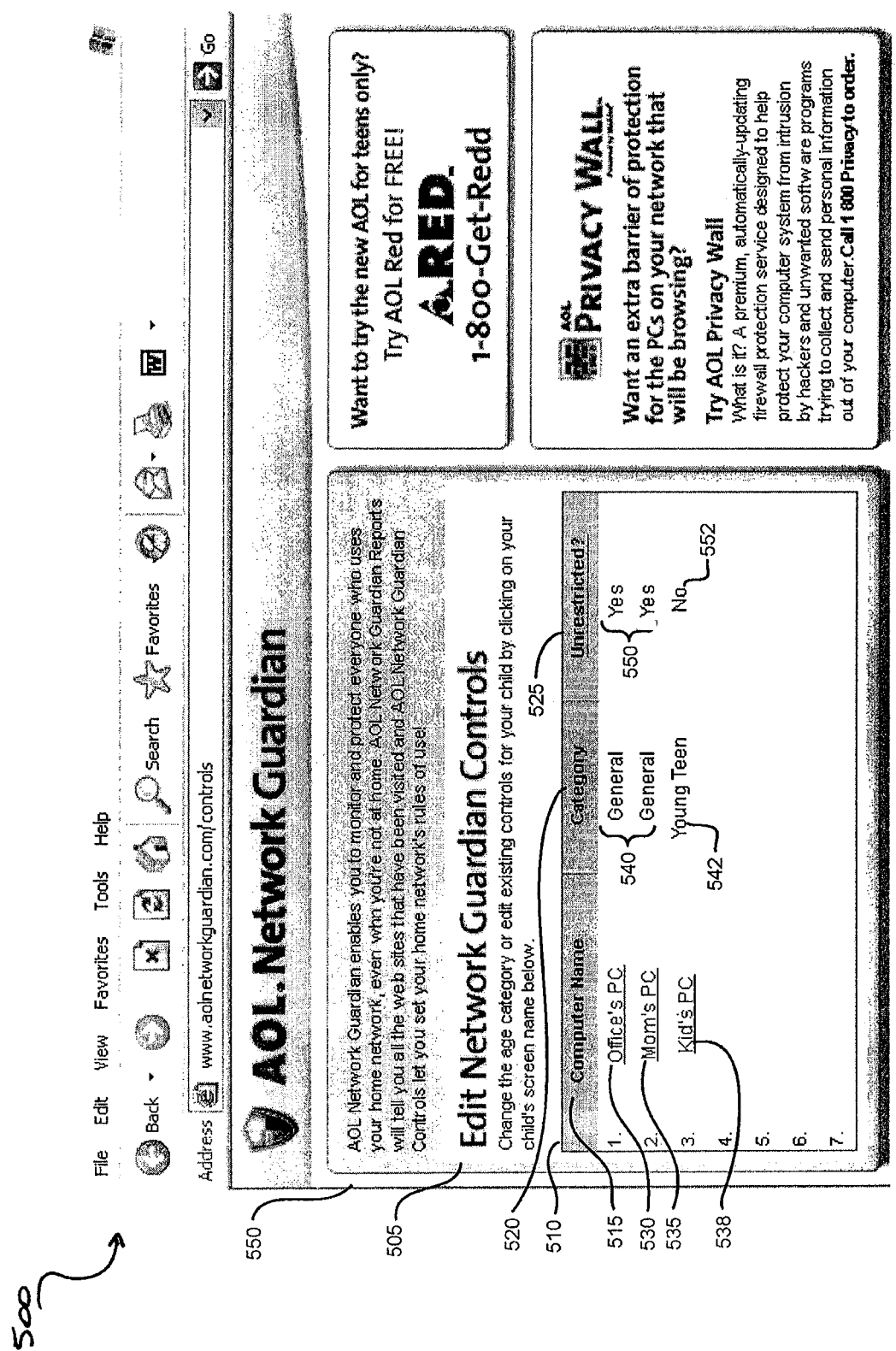
FIG. 5A illustrates an exemplary graphic user interface for configuring controls.

Referring to FIG. 5a, a graphic user interface (GUI) 500 for configuring controls is illustrated. The GUI 500 may be an interface to controls on, for example, one or more of the host 114 or the network interface device 110. The GUI 500 may be used in connection with the system 100 of FIG. 1 and the discussion below describes the GUI 500 in the context of the system 100. However, other systems may be used.

The GUI 500 includes edit instructions 505 and a client table 510. The client table 510 includes a computer name list 515, a category list 520, and a restriction decision list 525.

The edit instructions 505 include instructions pertaining to available control options and direct the user to available configuration options in the client table 510. The client table 510 describes the client 104 profiles that are associated with the network interface device 110.

Client 104 profiles may be associated with the network interface device 110 in various ways. For example, merely by entering a particular client 104 profile in the GUI 500, the particular client 104 profile (as well as the particular client 104) may be associated with the network interface device 110. Alternatively, or in addition, a particular client 104 profile (or, in some implementations, the particular client 104) may be associated with the network interface device 110 by having the network interface device 110 automatically associate those clients 104 that are in communication with the network interface device 110 to access content over the network 112. Alternatively, or in addition, consent from a particular client 104 may be required before associating the particular client 104 with the network interface device 110.

Note that the network interface device 110 may still apply access rules (and/or logging) to a client 104 that is not associated with the network interface device 110. For example, the network interface device 110 may apply access rules from a profile designated for "non-associated clients 104," or may apply default access rules that may apply to any client 104 (associated or not) for which a profile has not designated a specific category list 520 and/or a specific restriction decision list 525. The network interface device 110 also, or alternatively, may apply no access rules and allow access to all requested content, or may allow no access to any requested content. Further, the network interface device 110 may apply access rules (and/or logging) to a client 104, whether associated with the network interface device 110 or not, regardless of whether the client 104 has, for example, (1) received an Internet Protocol address from the network address device 110 or (2) self-generated an Internet Protocol address.

The client table 510 displays the client profile that includes the computer name list 515, the category list 520, and the restriction decision list 525. The computer name list 515 lists the names of the clients 104. The category list 520 lists the assigned categories of user access level. The assigned category of user access level is associated with predetermined network access rules, as described below. The restricted decision list 525 reflects whether a client 104 is granted unrestricted access for all access requests.

The computer name list 515 shows that three devices (three clients 104) are controlled by the table 510 and are associated with the network interface device 110. The computer name list 515 includes an Office's PC 530, a Mom's PC 535, and a Kid's PC 538. Office's PC 530 and Mom's PC 535 both are listed as having the category list 520 entry of "general" 540. Because both Office's PC 530 and Mom's PC 535 are associated with the same category, the network access rules associated with both clients are identical. The restricted decision for the general category 540 is unrestricted 550. All access requests will be granted for all users of either office's PC 530 or Mom's PC 535.

In contrast, however, Kid's PC 538 has a category of Young Teen 542 with a restricted decision list 525 of "No" 552. The "No" 552 indicates that the Kid's PC 538 is restricted, and the category of Young Teen 542 indicates that content not suitable for a young teen will be blocked for all users on Kid's PC 538.

The previous description is an example implementation of the GUI 500 for configuring controls, and other or different features may be included. For example, other details may be included in the client table 510 such as a numbered restriction level associated with a predetermined scale of restrictions.

Figure 5B:
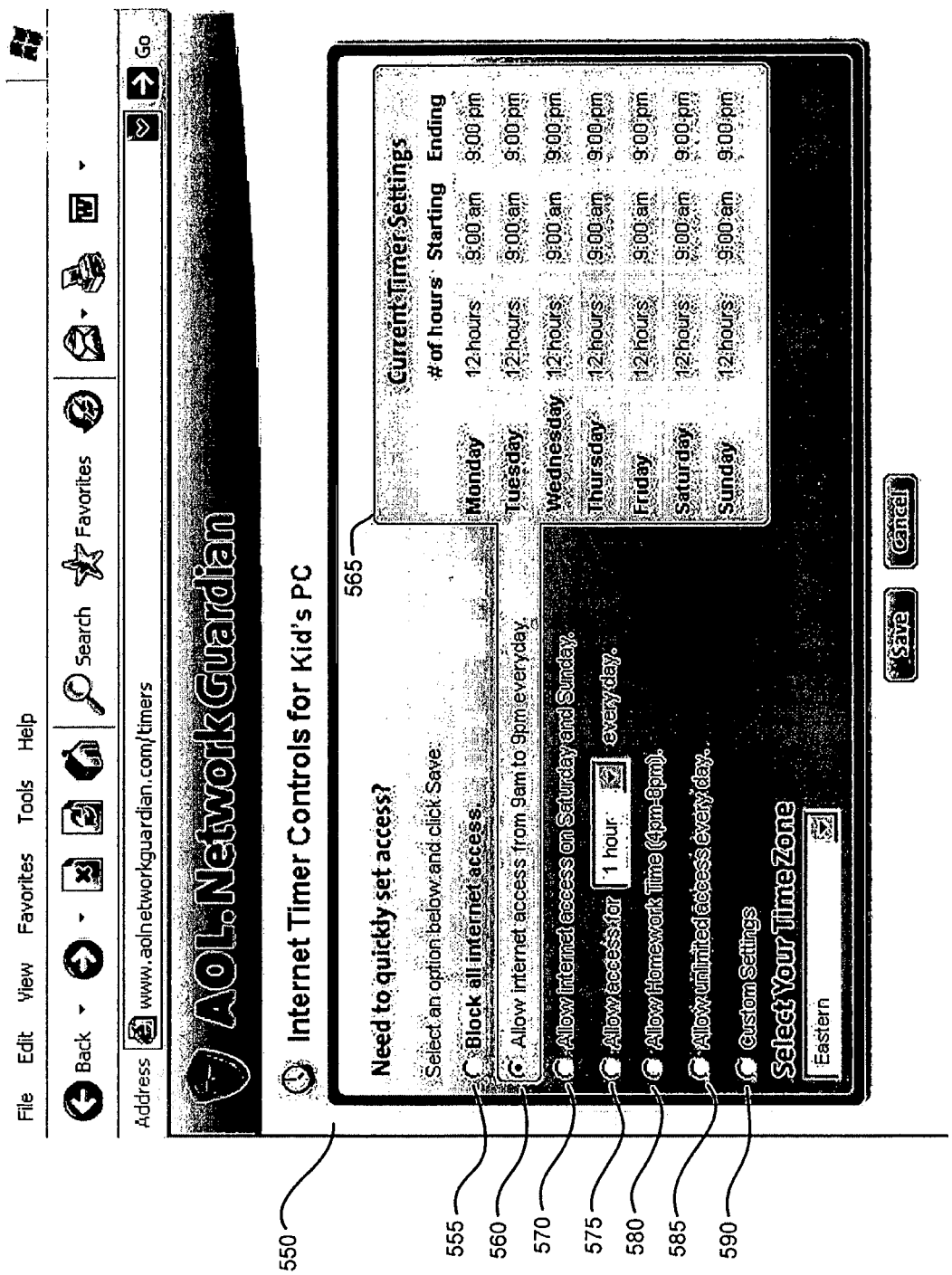
FIG. 5B illustrates an exemplary graphic user interface for configuring controls.

Referring to FIG. 5b, a GUI 550 for configuring controls is illustrated. The GUI 550 may be used in conjunction with the system 100 of FIG. 1 and the discussion below describes the GUI 550 in the context of the system 100. However, other systems may be used.

The GUI 550 includes various access control options for a client 104, specifically the Kid's PC 538.

Included in the access control options are various options that determine when, or how long, Internet access may be granted to a user of client 104. The options include (i) an option 555 to block all Internet access, which never allows an access request, (ii) an option 560 to allow Internet access by time of day which may grant an access request during predetermined times of specified days, (iii) an option 570 to allow Internet access on particular days only (Saturday and Sunday are shown in FIG. 5B), (iv) an option 575 to allow Internet access for a specified amount of time each day (1 hour is shown in FIG. 5B), (v) an option 580 to allow homework time, which may grant access requests from 4 pm-8 pm to allow use of the Internet for homework, or may block access requests from 4 pm-8 pm so that a user will not be distracted from homework, (vi) an option 585 to allow unlimited access every day, and (vii) an option 590 to allow custom settings, which may grant access requests according to a combination of the above access control options and/or access control options other than those previously mentioned.

After selecting access control options, sub-options are displayed. For example, after selecting the option 560 to allow Internet access by time of day, a chart 565 of days of the week and allowable access times is displayed. The chart 565 allows a user to select sub-options available for the access control options.

The previous description is an example implementation of the GUI 550 for configuring controls, and other or different access control options may be included. For example, an option may allow access when the control user is online using Kid's PC 538, thus providing an override of the standard access rules. As another example, an option may block all clients 104 that do not have a profile, thus precluding an unidentified machine from using the network interface device 110 to access content.

Figure 6A:
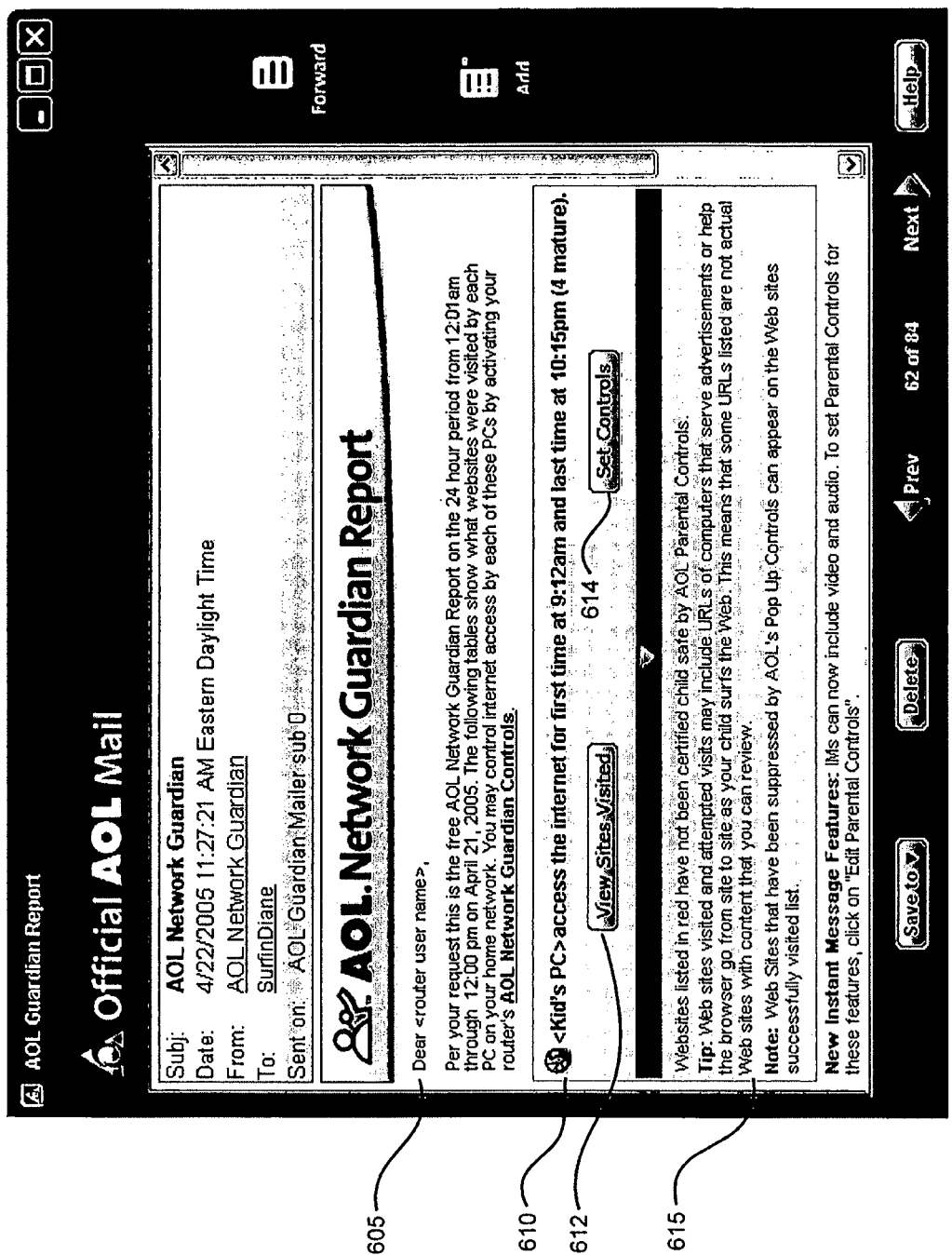
FIG. 6A illustrates an exemplary log report of access requests.

Referring to FIG. 6a, a log report of access requests 600 is illustrated. The log report of access requests 600 may be used in conjunction with the system 100 of FIG. 1 and the discussion below describes the log report of access requests 600 in the context of the system 100. However, other systems may be used.

The log report of access requests 600 includes a log introduction 605, a client options section 610, and a further information section 615. The log introduction 605 describes current log options such as the periodicity of the report generation. The client options 610 includes options that are directed towards information in the log report of access requests 600 that the user may choose to view. The further information section 615 includes other information deemed appropriate to the log report 600. For example, the further information section 615 may include notes and tips specific to information contained in the log report 600.

The client options section 610 includes options that enable the user to view different types of information. The client options section 610 relates to the client Kid's PC 538. The client options section 610 includes a selection 612 to view sites visited by Kid's PC 538 during the selected duration of the log report of access requests 600. The client options section 610 also includes a selection 614 to set controls, allowing the user to set or change access control options for Kid's PC 538.

The previous description is an example implementation of the log report of access requests 600 for configuring controls, and other or different access control options may be included. The report can be accessed in a variety of ways, such as by email or a webpage. The report can be sent periodically or continuously as the access requests are received. The log report of access requests 600 may also show information pertaining to denied or granted access requests. The log report of access requests 600 may include information pertaining to multiple clients 104 or may be generated for each client 104.

Figure 6B:
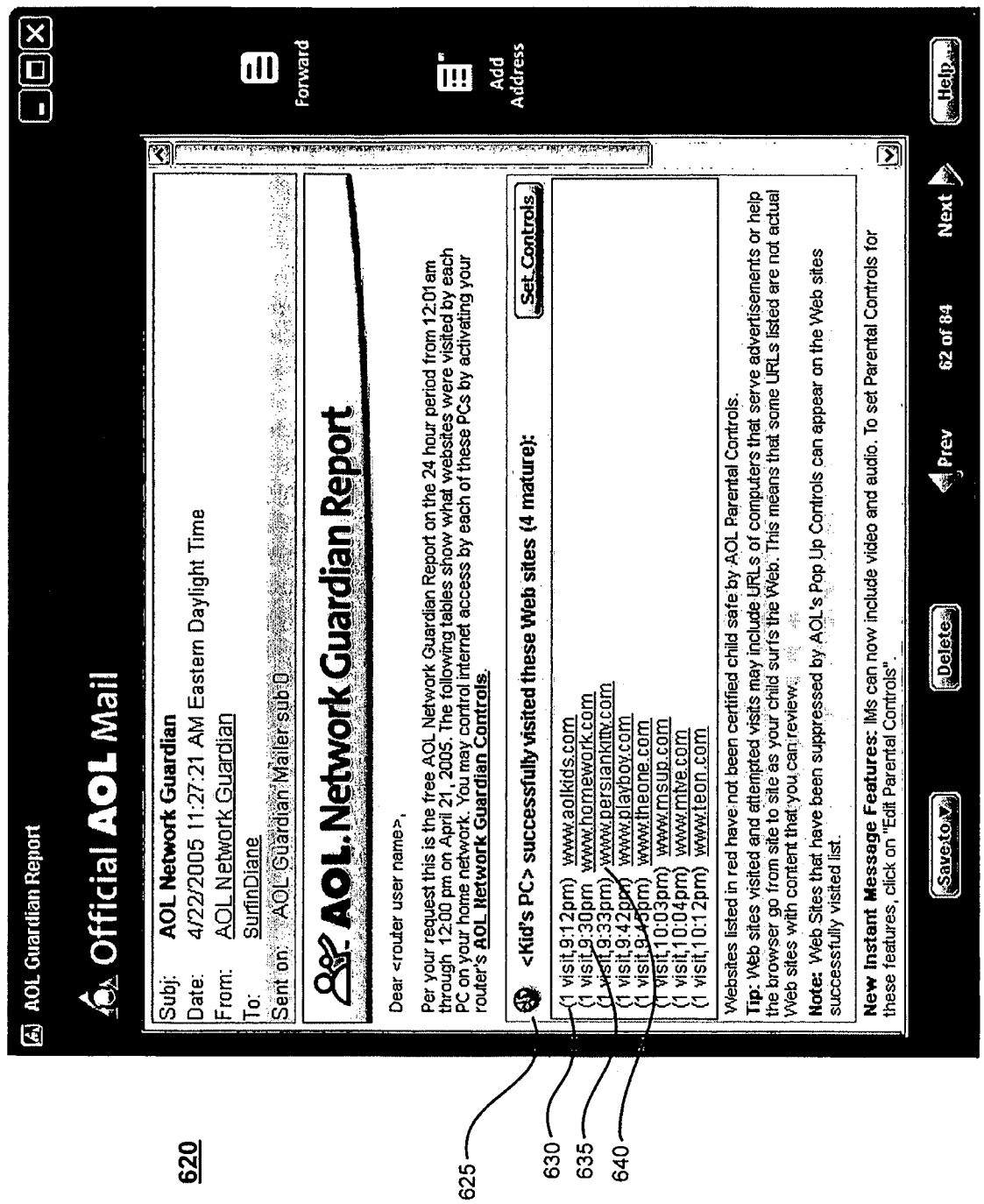
FIG. 6B illustrates an exemplary log report of access requests.

Referring to FIG. 6b, a portion 620 of the log report of access requests is illustrated that shows sites visited by Kid's PC 538. The portion 620 is displayed in response to an user selecting option 612 to view the sites visited by Kid's PC 538. The portion 620 includes a client log 625. The client log 625 includes a number of visits, such as, for example, an entry 630 showing one visit to www.aolkids.com at 9:12 pm. Each entry (e.g., entry 630) includes a frequency 635 showing the number of times a client 104 has accessed a particular URI, a time 635 showing the time of day at which the client 104 accessed the particular URL, and a location 640 showing a URL for the web address of the network location accessed by the client 104.

The previous description is an example implementation of the portion 620 showing sites visited. The portion 620 may display information for multiple clients 104 in separate client logs 625 or together as one client log 625. The information within the client log 625 may detail a summary of access requests such as the most frequently accessed sites or the most mature sites. The portion 620 may also show information pertaining to denied access requests.

Figure 6C:
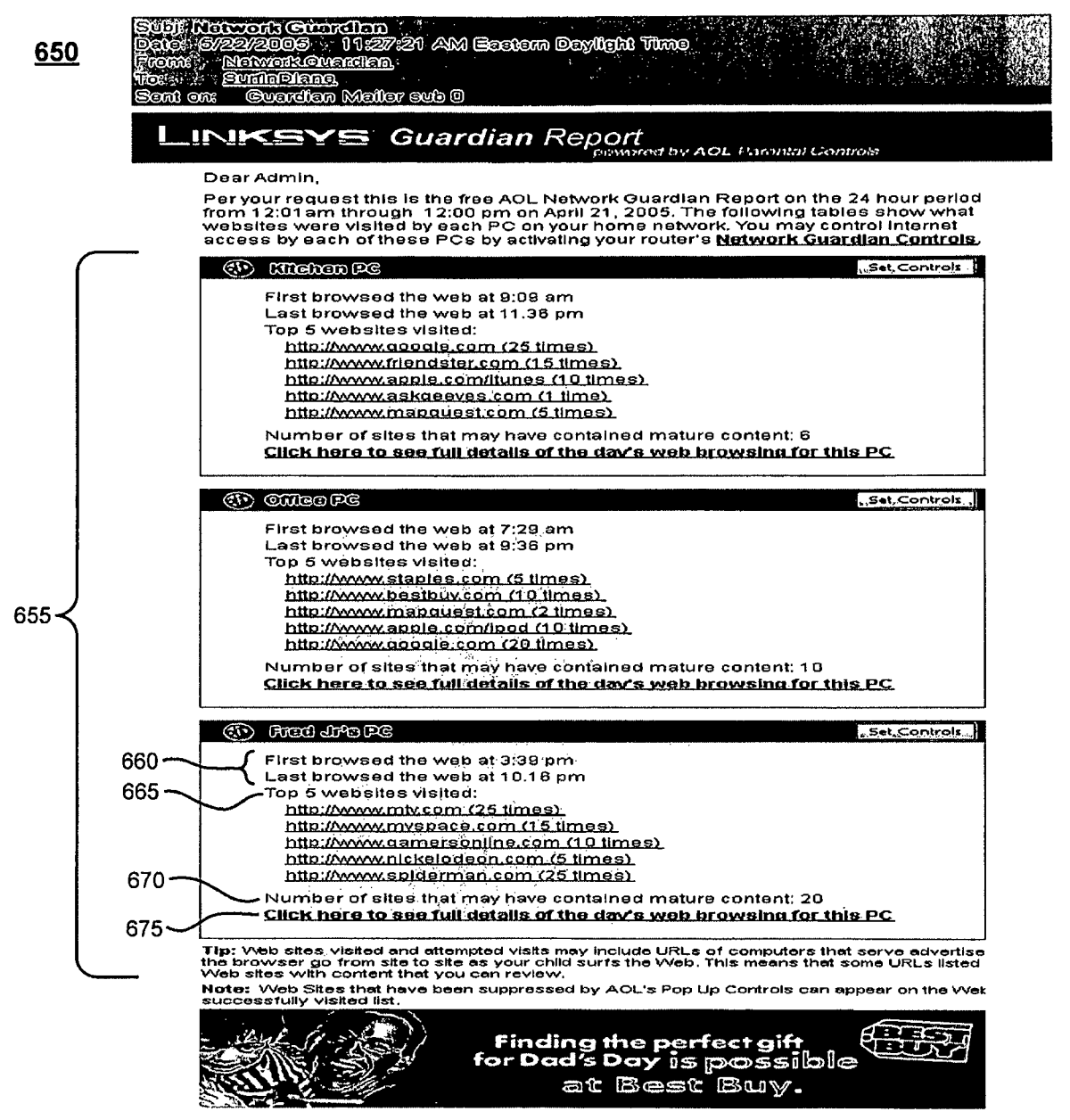

Referring to FIG. 6c, a log report of access requests 650 for multiple clients is illustrated. The log report of access requests 650 may be used in conjunction with the system 100 of FIG. 1 and the discussion below describes the log report of access requests 650 in the context of the system 100. However, other systems may be used.

The log report of access requests 650 includes a multiple client log 655. The multiple client log 655 includes a time feature 660 showing the time of the first and last browsing of the web. The multiple client log 655 also includes a list 665 of the top five websites visited, an indicator 670 of the number of mature sites viewed, and an option 675 to view full details of the browsing activity.

The time feature 660 indicates the time of the first access request during the time period of the log report of access requests 650 and the time of the last access request during the time period of the log report of access requests 650. The list 665 of the top five websites visited indicates the five websites which had the most access requests generated by the client 104 during the time period of the log report of access requests 650. The top five websites may be displayed, for example, in order of most recently visited. The indicator 670 of the number of mature sites viewed indicates the total number of access requests for mature sites by the client 104 during the time period of the log report of access requests 650. The option 675 to expand details enables a user to view further details included within the log report of access requests 650.

Implementation of the log report of access requests 650 may vary. For example, the log report of access requests 650 may also show information pertaining to denied access requests.

Figure 7:
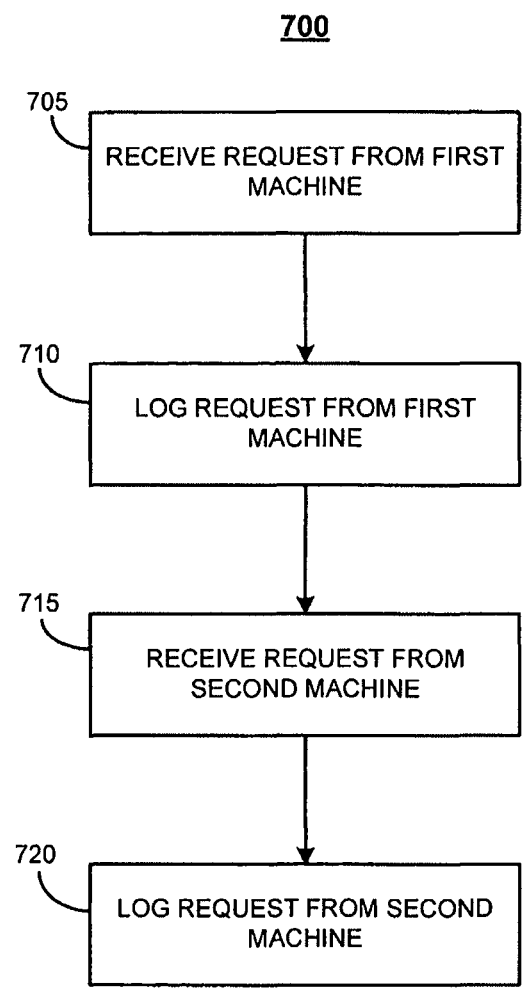
FIG. 7 illustrates an exemplary process for providing network access control and togging.

Referring to FIG. 7, a process 700 is illustrated for providing network access control and logging. The process 700 may be used in conjunction with the system 100 of FIG. 1 and the discussion below describes the process 700 in the context of the system 100. However, other systems may be used.

In the process 700, a network interface device 110 at a user location receives (705) a request from a first machine 104 at the user location. The request may include a first-machine identifier and a request to access through the network interface device 110 a first location on a network. In one implementation, receiving the request (705) is analogous to receiving the request sent in operation 305 of process 300.

The network interface device 110 logs the request from the first-machine 104 into a first-machine log for requests from the first machine (710). The log into the first-machine log is based on the first-machine identifier. In one implementation, logging the request (710) is analogous to operation 355 of process 300.

The network interface device 110 at the user location receives a request from a second machine 104 at the user location (715). The request includes a second-machine identifier and a request to access through the network interface device 110 a second location on the network. In one implementation, receiving the request (715) is analogous to operation 705.

The network interface device 110 logs the request from the second-machine 104 into a second-machine log for requests from the second machine (720). The log into the second-machine log is based on the second-machine identifier. In one implementation, logging the request (720) is analogous to operation 355 of process 300.

The process 700 may, but need not, include performing access control. Analogously, implementations may perform a process that performs access control without logging, such as, for example, by performing the process 400 without performing logging operations 335 or 355.

Figure 8:
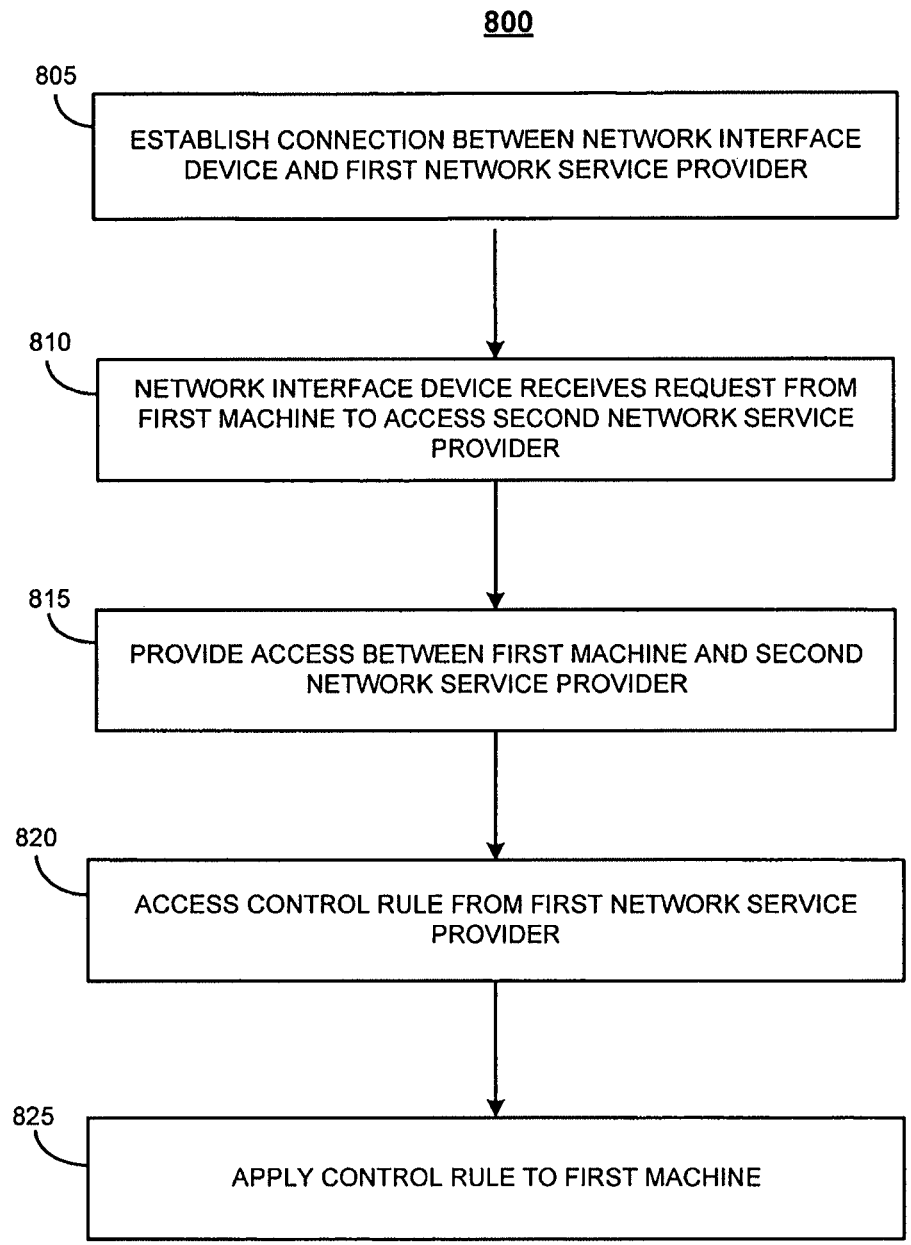
FIG. 8 illustrates an exemplary process for providing network access control and logging.

Referring to FIG. 8, a process 800 is illustrated for providing network access control and logging. The process 800 may be used in conjunction with the system 100 of FIG. 1 and the discussion below describes the process 800 in the context of the system 100. However, other systems may be used.

Process 800 includes establishing a connection between a network interface device 110 and a first network service provider (805). The network service provider includes network access control rules.

The network interface device 110 receives a request from a first machine 104 to access a second network service provider through the network interface device 110 (810). The second network service provider is different from the first network service provider.

Process 800 includes providing, through the network interface device 100, access between the machine 104 and the second network service provider (815). The network interface device 110 accesses a control rule from the first network services provider that governs service provided to the machine 104 from any network service provider (820). The network interface device 110 applies the access control rule to the machine 104 while the machine 104 is connected with the second network service provider in order to limit the service provided to the machine 104 from the second network service provider (825).

In one implementation of process 800, a client device connects to the Internet through a router at a user location. The client device requests content through an Internet Service Provider (ISP). The router, on the other hand, governs access based on rules and information stored with a host computer that is remote and distinct from the ISP. Thus, two logical connections are used—one between the client device and the ISP, and one between the router and the host.

Another example of an implementation according to process 800 involves a home that includes a PC and a wireless router, in wireless communication with each other. The router connects to the Internet and provides access, for the PC, to content on the Internet. The access is typically provided through a host, and the host also stores network access rules that are used to govern access to online content from any computer that connects to the Internet through the router. In practice, the users at the PC would ordinarily log-in to the host, and access to the Internet would be provided through the host. The router communicates with the host to access the rules and determine, based on the rules, whether or not to allow access to the requested content. In this scenario (other scenarios and implementations may differ), the host provides access to the Internet without screening, and relies on the router to do the screening based on the access rules stored on the host. In this example, however, the router also is able to log and screen content requests from a computer that during its offline operation and during operations not involving the host.

For example, a father may set up the host account to block objectionable content for all users of the PC at home. However, a son's friend may come over to the house with a laptop and use the wireless router to access the Internet through an Internet Service Provider (ISP) other than the host, such that the friend does not log-in to the host. In this case, the router still does communicate with the host to determine what access rules to apply to the presumably unrecognized laptop. The router also is able to apply those rules to the laptop even though the laptop does not use the host to get to the Internet. Accordingly, the router logs the friend's attempt to access objectionable content, and/or blocks the friend's attempt to access objectionable content so that the content is not delivered through the router to the laptop). Additionally, the father can access a log report that will indicate the exact websites that the friend attempted to access, the number of times the friend attempted to access those websites, and the times of day at which the attempts were made.

Referring again to FIG. 1, other implementations of the system 100 may provide that the server 116 is accessible through the host 114, with or without being directly accessible from the network 112 without going through the host 114.

Referring again to FIG. 3, other implementations of the process 300 include storing the grant/deny decision for a particular network location so that subsequent requests from a user to access the particular network location can be decided by accessing the stored decision. Further implementations of FIG. 3 also provide a bypass option so that the access rules for a given client are not applied to an authorized user. For example, the client may provide on an Internet browser an option labeled "bypass" that, when selected, allows an authorized user to enter a password. After the authorized user is verified, the network interface device no longer applies the normal access rules for that client but, rather, applies no rules at all or applies another set of rules that applies to the authorized user.

Referring again to FIGS. 6*a*-*c*, other implementations may allow an authorized user to tailor the log reports so that reports for each client have a different format, or reports for each user have a different format.

As is evident from the breadth of the disclosure; implementations, features, and techniques described herein, as well as variations or combinations of them, may be implemented at least in part, for example, in an operating system or in a stand-alone application or utility, running on one or more of a variety of devices. Such devices may include, for example, a personal computer, a server, a router, a gateway, or a special-purpose computer or machine. A device also may include, for example, discrete or integrated hardware, firmware, and software. A device may include, for example, a processor, which refers to processing devices in general, including, for example, a microprocessor, an integrated circuit, a programmable logic device, and a device containing a software application.

Such a device may be configured to perform one or more processes. For example, implementations may be embodied in a device that includes one or more computer readable media having instructions for carrying out one or more processes. The computer readable medium may include, for example, a storage device such as, for example, a hard disk, a compact diskette, a random access memory ("RAM"), and a read-only memory ("ROM"). A computer readable medium also may include, for example, formatted electromagnetic waves encoding or transmitting instructions. Instructions may be, for example, in hardware, firmware, software, and in an electromagnetic wave. Instructions may be found in, for example, an operating system, a separate application, or a combination of the two. A processor may be, for example, both a device configured to carry out a process and a device including computer readable media having instructions for carrying out a process.

A number of implementations have been described. Nevertheless, it will be understood that various modifications may be made. For example, elements of different implementations may be combined, supplemented, modified, or removed to produce other implementations. Further, various technologies may be used, combined, and modified to produce an implementation. Accordingly, other implementations are within the scope of the following claims.

What is claimed is:

1. A method comprising:

receiving client options corresponding to at one least report, wherein the client options comprise of at least one or more options of: periodicity, set controls, and information pertaining to sites viewed;

receiving, at a network interface device at a user location, a request from a first machine located at the user location, the request including a first-machine identifier and a request to access through the network interface device a first location on a network;

logging, at the network interface device, the request from the first machine into a first-machine log for requests from the first machine, the logging into the first-machine log being based on the first-machine identifier;

receiving, at the network interface device, a request from a second machine located at the user location, the request from the second machine including a second-machine identifier and a request to access through the network interface device a second location on the network, where the network interface device, the first machine, and the second machine are located at a user location;

receiving, at the network interface device, a second request from the first-machine, the second request from the first-machine including the first-machine identifier and a request to access through the network interface device at a third location on the network;

logging, at the network interface device, the request from the second machine into a second-machine log for requests from the second machine, the logging into the second-machine log being based on the second-machine identifier;

accessing a first-machine network access rules, wherein at least one access rule regulates how long access may be granted to the network;

determining, based on the accessed first-machine network access rule, whether to grant the first machine access to the first location on the network;

accessing a second-machine network access rule, wherein at least one access rule regulates what days access may be granted;

determining, based on the accessed second-machine network access rule, whether to grant the second machine access to the second location on the network; and providing the first-machine log, the second-machine log, and the at least one report to a recipient device based on the client options.

2. The method of claim 1 wherein receiving the request from the second machine comprises receiving the request from the second machine while the network interface device is coupled to both the first machine and the second machine.

3. The method of claim 1 further comprising:

logging, at the network interface device, the second request from the first machine into the first-machine log, the logging into the first-machine log being based on the first-machine identifier; and wherein: the first request from the first machine is sent using a first user identity that is logged in to a first account in a network service provider, and the second request from the first machine is sent using a second user identity that is logged in to a second account in the network service provider.

4. The method of claim 3 further comprising:

accessing a first-machine network access rule;

determining, based on the accessed first-machine network access rule, whether to grant the first machine access to the first location on the network; and determining, based on the accessed first-machine network access rule, whether to grant the first machine access to the third location on the network.

5. The method of claim 1 further comprising:

determining, based on the first-machine identifier, that the first machine is associated with the network interface device; and determining, based on the second-machine identifier, that the second machine is not associated with the network interface device.

6. The method of claim 1 wherein the second-machine network access rule provides that the second machine is prohibited from accessing the second location on the network based on the determination that the second machine is not associated with the network device.

7. The method of claim 1, wherein the network interface device includes a router.

8. The method of claim 7 further comprising receiving at the network interface device a token from the recipient device, the token configured to verify the identity of the network interface device, and wherein providing the first-machine log to the recipient device further comprises transmitting a communication to the recipient device based on the token.

9. The method of claim 1 wherein the first-machine log includes multiple requests from the first machine, the second-machine log includes multiple requests from the second machine, and the method further comprises:

providing the first-machine log and the second-machine log to a recipient device;

receiving at the recipient device settings from a control user associated with the network interface device, wherein the settings include:

first-machine report compilation instructions specifying how to compile requests from the first machine in the first-machine log, and second-machine report compilation instructions specifying how to compile requests from the second machine in the second-machine log;

compiling requests from the first-machine log according to the first-machine report compilation settings;

compiling requests from the second-machine log according to the second-machine report compilation settings;

generating at least one report based on the compiled requests from the first-machine log and the compiled requests from the second-machine log; and providing the at least one report to the control user.

10. The method of claim 9 wherein providing the at least one report to the control user comprises sending the report to the control user in an email.

11. The method of claim 9 wherein providing the at least one report to the control user comprises making the report accessible to the control user on a web page.

12. The method of claim 9 wherein:
the first-machine report compilation instructions and the second-machine report compilation instructions are different;
generating at least one report comprises:
generating a first report based on the compiled requests from the first-machine log, and generating a second report based on the compiled requests from the second-machine log; and
providing the at least one report comprises: providing the first report to the control user, and providing the second report to the control user.

13. The method of claim 1 wherein the logged request from the first machine includes the time at which the first request was received at the network interface device.

14. The method of claim 1 further comprising, wherein the first-machine network access rule and second machine access rule is associated with a category indicative of a predetermined user access level.

15. The method of claim 14 further comprising, wherein the predetermined user access level is associated with predetermined network access rules.

16. A system comprising:
one or more processors; and
a memory storing instructions, the instructions being executable by the one or more processors to perform operations comprising:
receiving client options corresponding to at one least report, wherein the client options comprise of at least one or more options of: periodicity, set controls, and information pertaining to sites viewed;
receiving a request from a first machine, the request including a first-machine identifier and a request to access a first location on a network, and receiving a request from a second machine, the request including a second machine identifier and a request to access a second location on the network, the first machine and the second machine being located at a user location;
receiving, at the network interface device, a second request from the first machine, the second request from the first machine including the first-machine identifier and a request to access through the network interface device at a third location on the network;

logging the request from the first machine into a first-machine log for requests from the first machine, the logging into the first-machine being based on the first-machine identifier, logging the request from the second machine into a second-machine log for requests from the second machine, the logging into the second-machine being based on the second-machine identifier;

accessing a first-machine network access rules, wherein at least one access rule regulates how long access may be granted to the network;

determining, based on the accessed first-machine network access rule, whether to grant the first machine access to the first location on the network;

accessing a second-machine network access rule, wherein at least one access rule regulates what days access may be granted;

determining, based on the accessed second-machine network access rule, whether to grant the second machine access to the second location on the network; and providing the first-machine log, the second-machine log, and the at least one report to a recipient device based on the client options.

17. The system of claim 16 wherein:
the receiving of the request from the first machine, and the receiving of the request from the second machine, and the second portion of the apparatus comprises a second portion of the computer readable medium having instructions for performing:
the logging of the request from the first machine into the first-machine log for requests from the first machine, and the logging of the request from the second machine into a second-machine log for requests from the second machine.

18. The system of claim 16 further comprising:
logging of the request from the first machine into the first-machine log for requests from the first machine, and the logging of the request from the second machine into a second-machine log for requests from the second machine.

19. The system of claim 16 wherein the system is further configured for:
accessing a first-machine network access rule associated with a category indicative of a predetermined user access level;
determining, based on the accessed first-machine network access rule, whether to grant the first machine access to the first location on the network;
accessing a second-machine network access rule associated with a category indicative of a predetermined user access level; and
determining, based on the accessed second-machine network access rule, whether to grant the second machine access to the second location on the network.

* * * * *